Dec. 30, 1952 G. M. GUSTIN 2,623,559

FEEDING MECHANISM FOR WOODWORKING MACHINES

Filed Jan. 24, 1949 8 Sheets-Sheet 1

INVENTOR.
George M. Gustin
BY
W. P. Hahn
ATTORNEY.

INVENTOR.
George M. Gustin
BY
W. P. Hahn
ATTORNEY.

Dec. 30, 1952 G. M. GUSTIN 2,623,559

FEEDING MECHANISM FOR WOODWORKING MACHINES

Filed Jan. 24, 1949 8 Sheets-Sheet 3

INVENTOR.

George M. Gustin

BY

W. P. Hahn

ATTORNEY.

FEEDING MECHANISM FOR WOODWORKING MACHINES

Filed Jan. 24, 1949 8 Sheets-Sheet 4

INVENTOR.
George M. Gustin
BY
W. P. Hahn
ATTORNEY.

INVENTOR.

George M. Gustin

BY

W. P. Hahn

ATTORNEY.

FEEDING MECHANISM FOR WOODWORKING MACHINES

Filed Jan. 24, 1949 8 Sheets-Sheet 6

INVENTOR.
George M. Gustin
BY
W. P. Hahn
ATTORNEY.

FEEDING MECHANISM FOR WOODWORKING MACHINES

Filed Jan. 24, 1949 8 Sheets-Sheet 7

INVENTOR.

George M Gustin

BY W.P. Hann

ATTORNEY

Dec. 30, 1952 G. M. GUSTIN 2,623,559

FEEDING MECHANISM FOR WOODWORKING MACHINES

Filed Jan. 24, 1949 8 Sheets-Sheet 8

INVENTOR.
George M. Gustin.
BY
W. P. Hahn,
ATTORNEY.

Patented Dec. 30, 1952

2,623,559

UNITED STATES PATENT OFFICE 2,623,559

FEEDING MECHANISM FOR WOODWORKING MACHINES

George M. Gustin, Wabash, Ind.

Application January 24, 1949, Serial No. 72,353

7 Claims. (Cl. 144—242)

The present invention relates to improvements in wood working machines of that character requiring mechanism for guiding and feeding the work to and through the operative elements of the machine, which may be, as herein illustrated, a cutting tool such as a saw blade or other wood working appliance.

It is one of the objects of this invention to provide such a wood working machine with an adjustable feeding mechanism for feeding the work to the saw or other appliance in a predetermined path in conjunction with the usual pressure head or like structure for holding the work to the feeding mechanism.

More specifically, the invention has to do with the practice of cutting, edging or jointing the edges of wood strips to form the mating surfaces for gluing these strips into cores or panels or producing straight or curved edges on strips or panels of wood or other materials; and it is also applicable for use in a machine for edge jointing veneer or solid materials or in other machines where material in sheet or strip form must be carried in a straight or slightly curved path to or past the cutting or processing tool or appliance.

Through the medium of this invention the feed chain race or races may be sprung by adjustment to guide the chain or chains and the work fed thereby through curved paths relative to the tool or working appliance. Such paths over which the work is thereby advanced may be straight or of a concave or a convex character. By adjusting, setting and controlling the path of the chain through adjustment of the race, various cutting and jointing effects may be developed, as hereinafter more specifically set forth and described.

For the purpose of disclosing the invention I have illustrated one embodiment thereof in the accompanying drawings in which.

Figure 1:
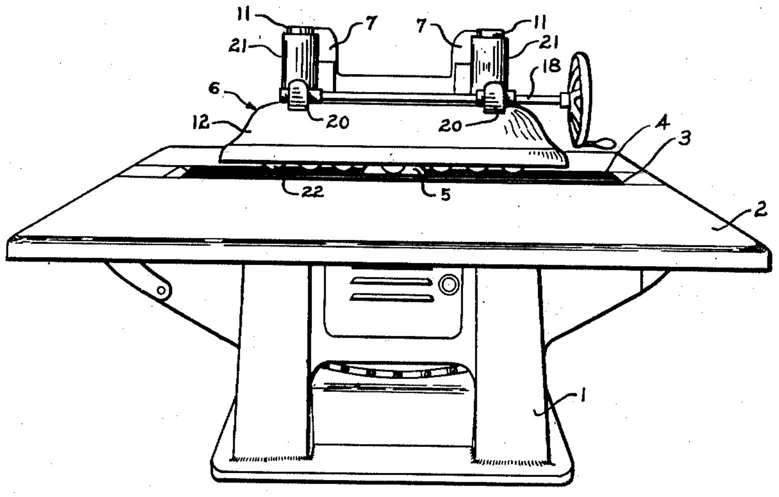
Fig. 1 is a side perspective of a rip saw machine illustrative of one embodiment of my invention.
Figure 2:
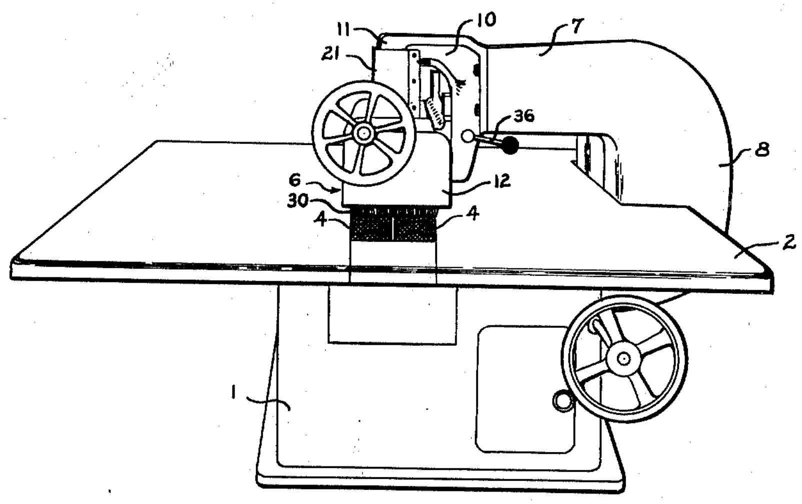
Fig. 2 is a front prespective view of the saw structure.
Figure 3:
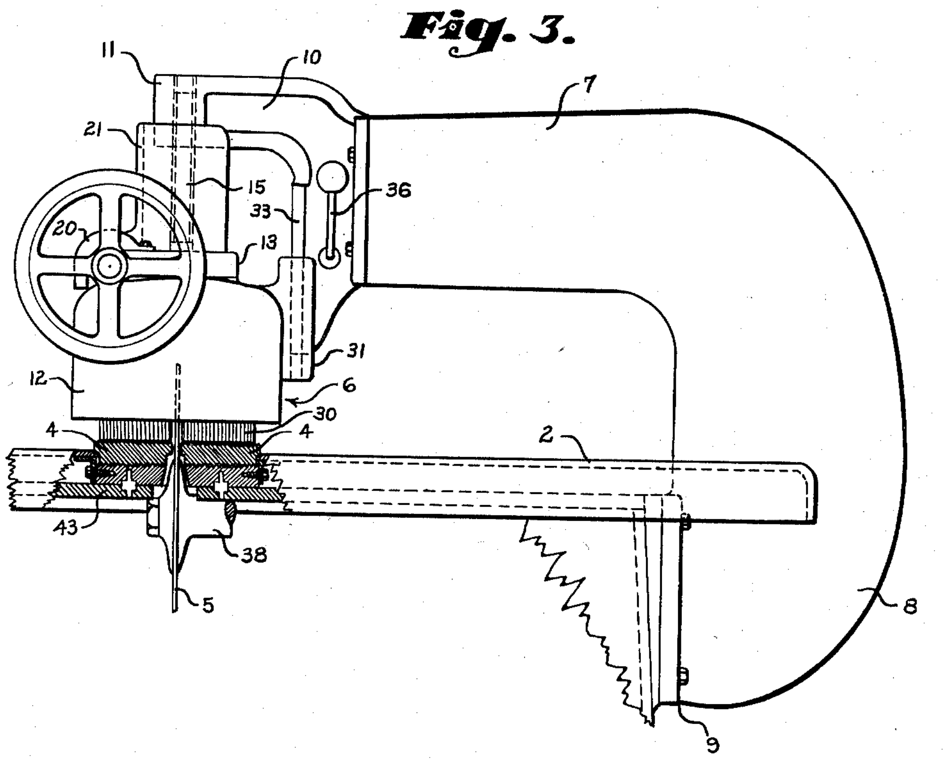
Fig. 3 is a detailed front elevation, partly in section, of one of the supporting arms and the presser head.
Figure 4:
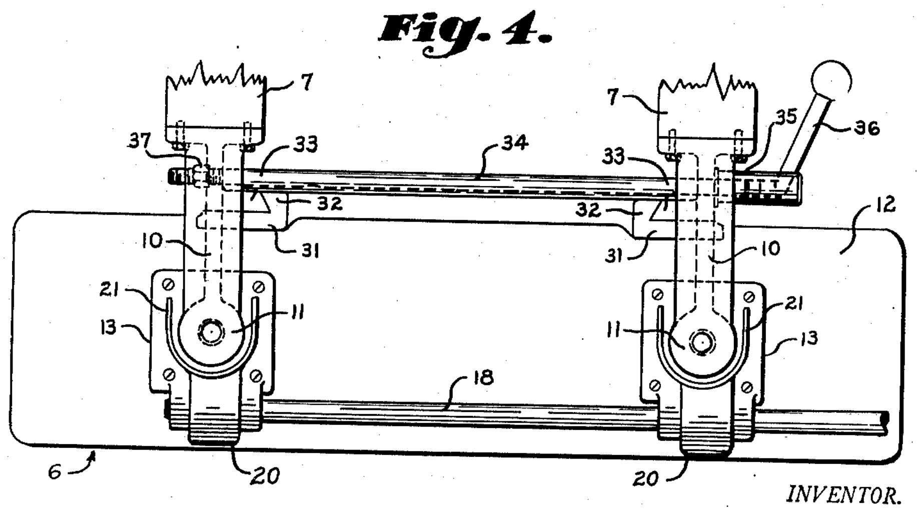
Fig. 4 is a detailed plan view showing the locking means for locking the presser head in position.

In the embodiment of the invention illustrated, I provide a base 1 carrying on its top a suitable table 2 which is provided with a center opening 3 in which operates the chain feeds 4 which feed the work to a cutting tool, herein shown as a rotary saw 5 projecting above the top of the table. The work is pressed against the feed chains through the medium of a presser head 6. This presser head is vertically adjustably mounted on a pair of overhanging arms 7 having downwardly extending standards 8 secured as at 9 (Fig. 3) to the frame so that each of the standards is rigidly supported, although due to the extension of the overhanging arms, the arms may be sprung toward one another for locking purposes to be more fully hereinafter described.

Each of the arms, at its forward end, is provided with a bracket 10 bolted to the front face of the arm and provided at its outer end with an enlarged cylindrical portion 11.

The presser head comprises a housing 12 provided on its upper surface with a pair of hollow houses 13. In each of these houses operates a helical gear 14, having an upwardly extending screw 15, threaded into one of the cylindrical portions 11. The helical gear and screw are vertically moved due to the threaded engagement of the screw with the portion 11 and in this vertical movement, the gear 14 bears upon the underface of a boss 16 extending downwardly from the top 17 of the houses 13 to thereby elevate the same.

A shaft 18 is mounted in the housing 13 and this shaft 18 carries a pair of helical gears 19 respectively meshing with the helical gears 14 so that the rotation of the shaft will simultaneously rotate the gears 14 and screws 15 to thereby vertically adjust the housing 12. Suitable cover members 20 enclose the gears 19 and suitable semi-circular covers 21 enclose the screws 15.

The housing 12 has mounted therein and adapted to project below the surface thereof, a plurality of rollers 22 each of which is biased downwardly but is so mounted as to move substantially vertically. To this end each roller is mounted upon a shaft 23 extending between the free ends of a pair of interconnected links 24. The rear ends of the links are pivotally mounted as at 25 to the inner faces of the housing. Each of the links has a curved stirrup 26 extending therefrom. The free end of the stirrup bears upon the next adjacent pivot member 25 of the next adjacent roll, and interposed between the top of the stirrup and the under face of the top of the housing is a coiled spring 27 which is centered upon suitable bosses 28 and 29. By this arrangement the rollers are biased downwardly by the coiled spring although the extent of the downward movement of the rollers is limited.

The rollers 22 are in direct vertical alignment with the axis of the saw and the rollers at the front and rear thereof are arranged in spaced pairs to accommodate the saw and the stirrups of these rollers bear on limit pins extending inwardly from the sides of the housing 12, a short distance only so as to clear the saw.

At the intake end of the presser head I preferably mount a pivoted guard 30 in the form of a plurality of fingers which will serve to prevent slivers from being thrown toward the operator.

It is important that the presser head be accurately guided in its movement, when vertically adjusted by the screws 15, and after once having been adjusted to the proper vertical height be rigidly locked in its adjusted position. To this end I provide a split dove-tail guide. On the rear face of the housing 12 I provide spaced apart guide rails 31—31, which may be rigidly bolted to the rear face or which may be cast integrally. Each of the guide rails is provided with dove-tail flanges 32. On each of the brackets 10 I provide cooperating dove-tail guide rails 33, on which the dove-tail rails 31 slide. The clearance of these slides when unlocked is extremely small so that there is a minimum of lost motion in the slides during adjustment of the presser head.

A locking bar or rod 34 extends through the brackets about a point centrally located vertically of the rails 33 and this rod at one end has a stop member 35 formed thereon in which is mounted a rotating handle 36. The opposite end of the rod is threaded through a nut 37 stationarily mounted on the bracket. Therefore by rotating the rod in one direction the two brackets 10 may be drawn together, there being sufficient spring or give in the arms 7 and the brackets to permit this, and when so drawn together the dove-tail rails 33 are wedged into the dove-tail flanges 32 to securely lock the parts in position. I have found from experience that this locking action practically makes the presser head an integral part of the arms. Obviously by rotating the rod 34 in the opposite direction this lock is released so that by the manipulation of the shaft 18 the presser head may be vertically adjusted.

The saw 5, or other cutting tool may be mounted upon a suitable shaft 38 vertically adjustable by mechanism, not shown, and driven by a suitable driving mechanism, not shown. This tool is adapted to project above the top of the table 2 and may be adjusted to different heights depending upon the thickness of the work.

Disposed across the table 2 there is a chain feed guide having a pair of guide races 39 and 40 extending in substantially parallel spaced relation on either side of the cutting tool. The upper faces of said races are provided with V-shaped guide grooves 41. At the point where the side edges of the guide races 39 and 40 lie adjacent to the saw the side faces 42 are chamferred off to accommodate the saw hub. Each of these guide races is mounted on a bottom plate or bed 43 (Fig. 9) forming a part of the frame of the base. The two guide races 39 and 40 may be spaced apart by spacer blocks to provide a slot there between to accommodate the saw. Suitable dowel pins 44 extend between the adjacent edges of the races and through the blocks maintaining the block in position. However, said races may be of one piece formed to provide said slot. Each of the races is rigidly anchored by a suitable bolt or screw 45 extending through the bed 43 and into the race on its underside, which screw or bolt is disposed closely adjacent to the rear end of the race. It is to be understood that the intake end of the apparatus as particularly illustrated herein is referred to as the front end and the delivery end is referred to as the rear end. A second rigid locking pin 46 similiar to the locking pin 45 rigidly locks the race to the bed 43 at a point about adjacent the rear edge or heel of the saw. At a point about adjacent the front or cutting edge of the saw I may provide a pivot member for the front portion of the race. This pivot member preferably consists of a bushing 48 half fitting into a corresponding socket on the underface of the race and half fitting into a corresponding socket on the upper face of the bed 43. A screw 47 passes through the bushing 48, locking the races to the bed.

The guide races 39 and 40, in addition to the screws 45, 46 and 47 may be maintained at a point in front of the saw by the pivot bushing 48 and at a point behind the saw in spaced relation by the fin 52. The block 52′ prevents saw dust being thrown toward the front.

Figure 10:
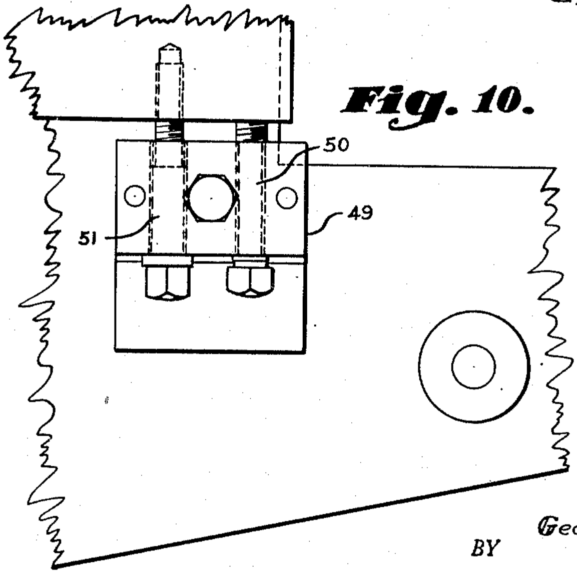
Fig. 10 is a detailed plan of the guide race adjusting means.
Figure 11:
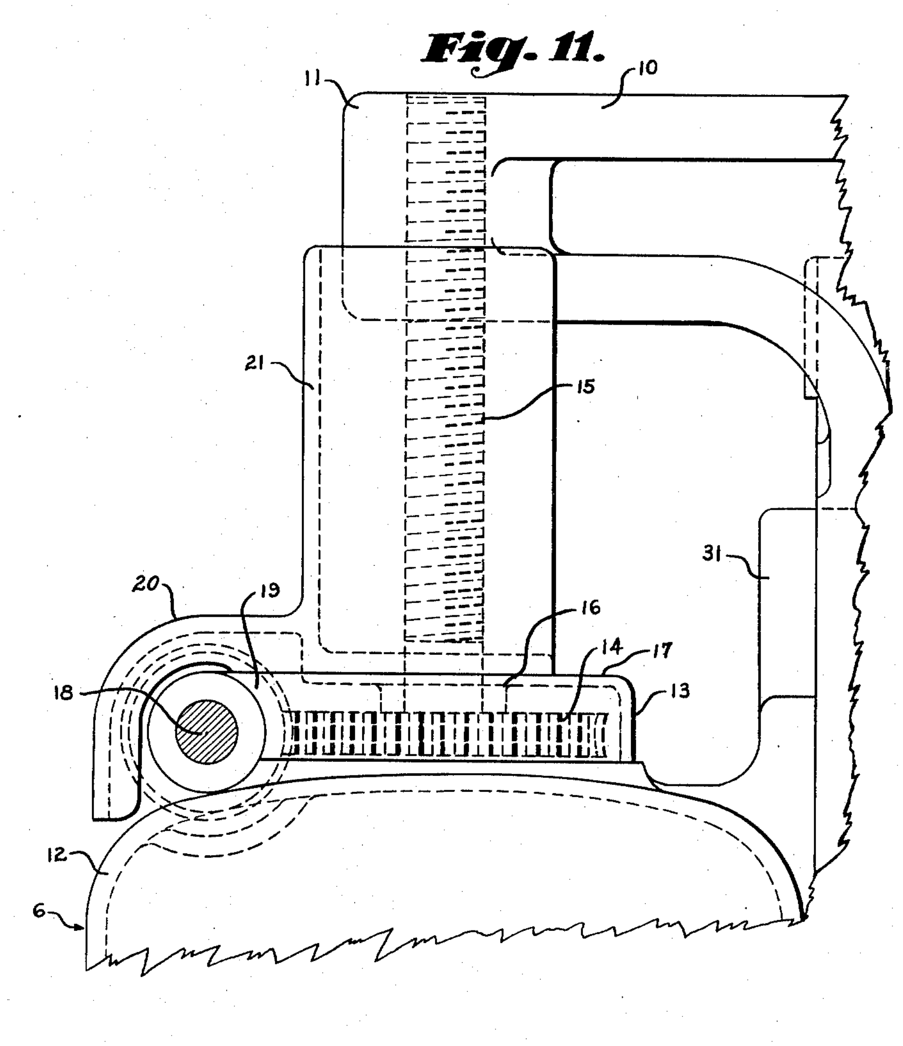
Fig. 11 is a detail showing the vertical adjusting means for the presser head.
Figure 12:
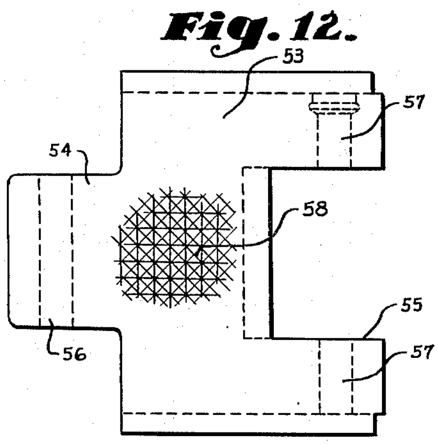
Fig. 12 is a plan view of one of the links of the feed chain.
Figure 13:
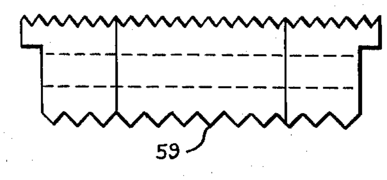
Fig. 13 is an end view of such link.

In actual practice I find it advantageous to have the guide races slightly diverge toward their rear ends. This divergence, however, is very small being only a few thousandths of an inch. By the above arrangement it is to be noted that at points beyond and in front of the saw, the guide races are rigidly held against displacement. By applying the proper pressures at the front end of the race, that portion of each race adjacent to the saw may be sprung so that it extends in a convexed, concaved or straightened path depending upon the direction in which the pressure at the end of the race is applied. In Fig. 10 there is shown an adjusting means for adjusting the race. To accomplish this result I provide a block 49 which is suitably bolted or otherwise secured to the frame and through this block is threaded a pressure screw 50 which abuts against the front end of the race. Likewise through this block there extends what may be termed a tension screw 51 which threads into the front end of the race. By rotating the screw 50 in a direction to advance the screw, pressure is applied to the front end of the race which will cause the race to be sprung from the rigid pin 46 and about the pivot bushing 48, to concave that portion of the race extending from a point in front of the saw to a point beyond the rear of the saw. Obviously with the race sprung as above described the feed chains 4, will travel in a bowed path. Conversely if the screw 51 is rotated to pull the end of the race in the opposite direction the race will be convexed at that portion opposite the saw. Or the screws may be so adjusted that the race will be in a straight line. The advantages of this structure will appear more fully hereinafter when the operation of the chain feed is described.

Between the races 39 and 40 and beyond the saw space I preferably provide a fin 52 which not only helps to maintain the races properly spaced at this point but also projects above the top surface of the race and between the feed chains, below the top surface thereof.

The work is fed beneath the presser head and to the saw by a means of suitable feed chains 4, one disposed on each side of the saw. Each of the feed chains comprises a series of links 53 having a front tongue 54 and a rear recess 55. The tongue 54 is adapted to fit in the recess 55 of a next adjacent link and the links are pivotally connected together by pins passing through the openings 56 in the tongues and the opening 57 in the sides of the recess 55. The top surface of each of the links is roughened as at 58 to give a suitable friction surface for engagement with the material to be fed and the bottom surface of each link is provided with a series of V-shaped ribs 59 adapted to fit in and be guided by the V-shaped groove 41 in the tops of the races 39 and 40.

The feed chains pass over suitable sprockets 63 and 64 at the front and rear of the machine, one of which is driven.

In operation herein shown for illustration, with the presser head 12 adjusted to the proper height to give the correct pressure on the material as it is fed there beneath, the operator feeds the material to be cut into the front end of the machine beneath the guard 30 and onto the feed chains. As soon as the material passes beneath the first roller of the presser head it is pressed onto the feed chains and is then carried by these chains to the saw which rips the material as it passes the same. The feed chains are guided by the rib and groove engagement between the bottoms of the chains and the top of the races so that the feed chains are always maintained in their correct position and there is no danger of side slip. If the races are sprung or concaved in the manner heretofore described the edges of the material as it is cut by the saw will be slightly concaved from end to end so that when these two edges are placed in abutted position and glued together with clamps forcing the two edges together a perfect match will be obtained with the abutted faces contacting at every point. It is understood of course that this concaving is extremely slight.

Furthermore with the material fed by the chains travelling in what may be called an arcuate path the arc of the path is such that the faces of the ripped board will just about clear the rear edge of the saw. The adjustment may be made so that this clearance is so slight as to allow the sides of the teeth of the saw to just touch the sawed edges and thereby obtain an edge finish which needs no further finishing for gluing purposes.

The structure is such that it will handle comparatively thick lumber and I have found in actual practice that with the structure above described I can provide a rip saw which will provide such a finished surface or edge that the abutting edges may be glued together without further finishing, and in such a manner that the glue line is barely discernible.

Figures 7, 8, 9:
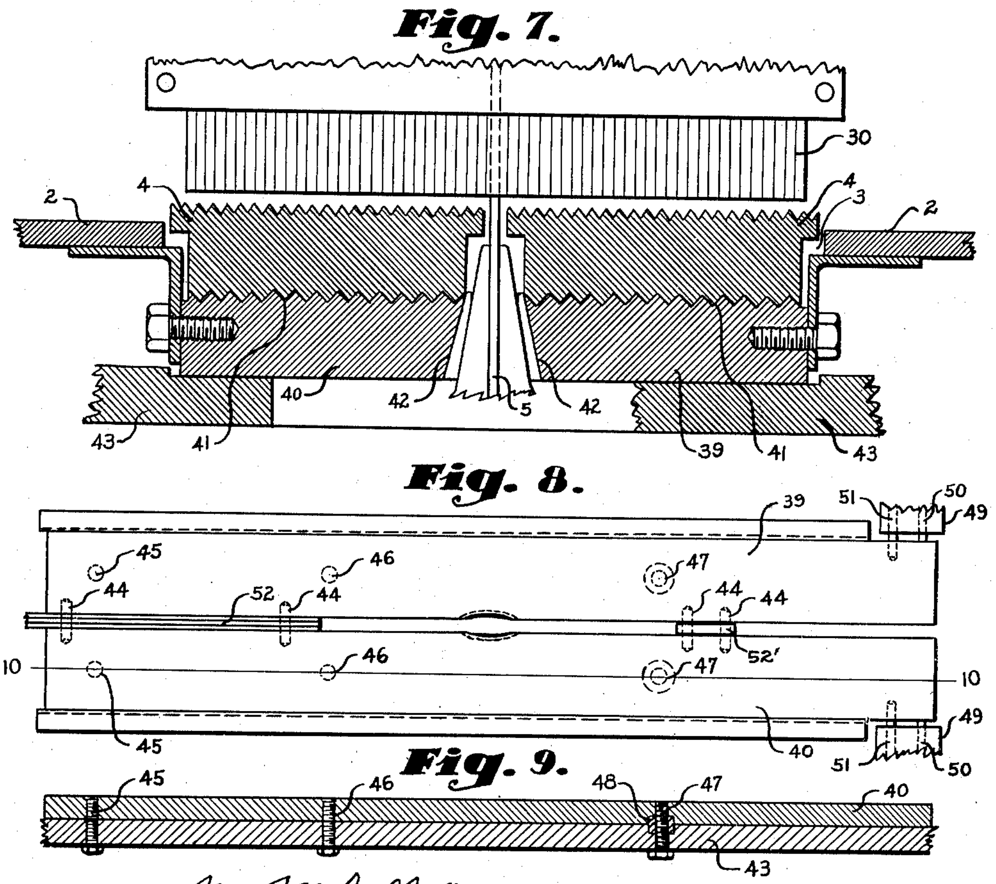
Fig. 7 is a detailed section of the material feeding means and the guide races therefore.
Fig. 8 is a plan view of the feed chain guide races.
Fig. 9 is a sectional view of the chain guide race.
Figure 14:
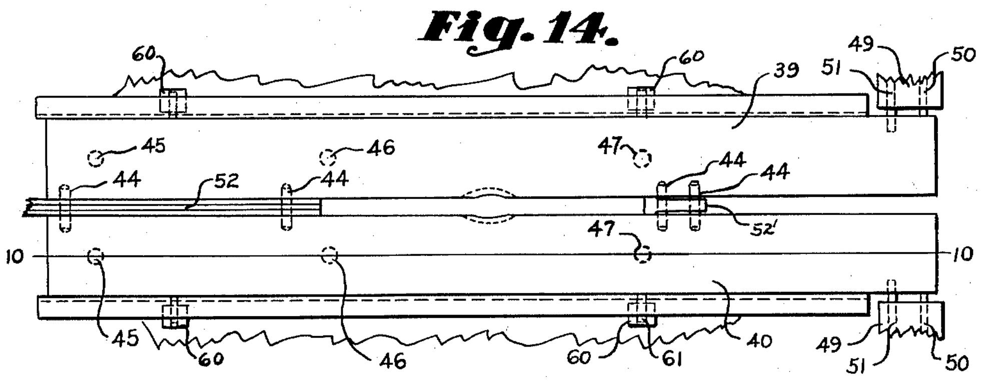
Fig. 14 is a plan view of a modification of the guide races shown in Fig. 8.
Figure 15:
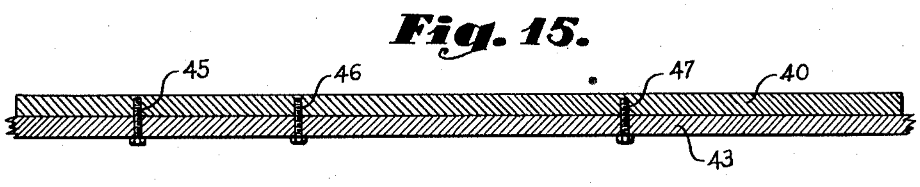
Fig. 15 is a sectional view thereof.
Figure 16:
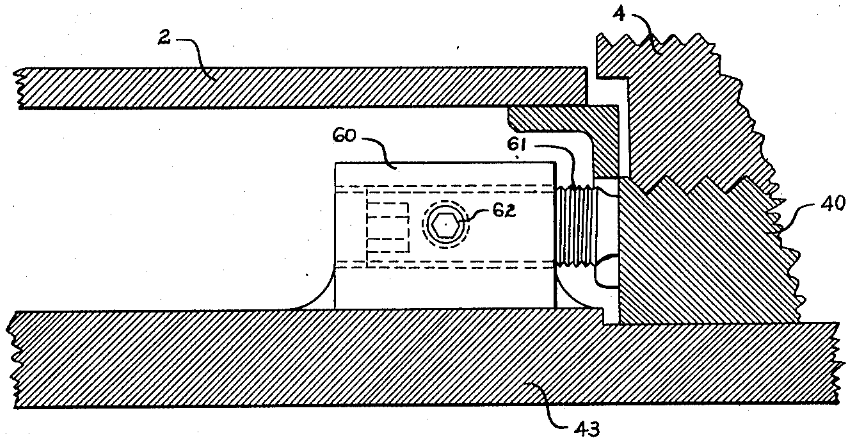
Fig. 16 is a detail view showing the guide race bracing means.

In Figs. 14, 15, and 16 I have illustrated a modification of the guide races 39 and 40 illustrated in Figs. 8, 9 and 10. In the structure illustrated in Figs. 14, 15 and 16 the guide races 39 and 40 are secured, or clamped, to the bed 43 by the screws 45, 46 and 47. However, due to the fact that there may be a slight play between the races and these screws, in order that the races may be rigidly anchored at their fulcrum points and properly adjusted I provide fulcrum members 60 for each race, which fulcrum members are disposed longitudinally of the guide races at a point approximately in line with the front edge of the saw and at a point to the rear of the rear edge of the saw. Each of the fulcrum members comprises a block welded or otherwise secured to the top face of the bed 43 and each of the fulcrum members 60 there is provided a threaded adjusting screw 61 which is adapted to be turned up to bear against the side face of the guide member and which may be locked in its adjusted position by the locking screw 62.

By this arrangement the guide races 39 and 40 are maintained in accurate position while the spacing blocks 52 and 52′ actually provide the fulcrum members on which the guide races are sprung in the manner heretofore described.

As in the structure illustrated in Fig. 8 the guide races 39 and 40 slightly diverge at their rear, the spacing block 52 being slightly wider than the spacing block 52′. It is to be noted that the forward portion of the spacing block 52′ is slightly relieved on each side so that the rear portion only provides a bearing member. The bearing surface of the spacing block 52′ is approximately in line with the front fulcrum members 60 and screws 47.

Figure 17:
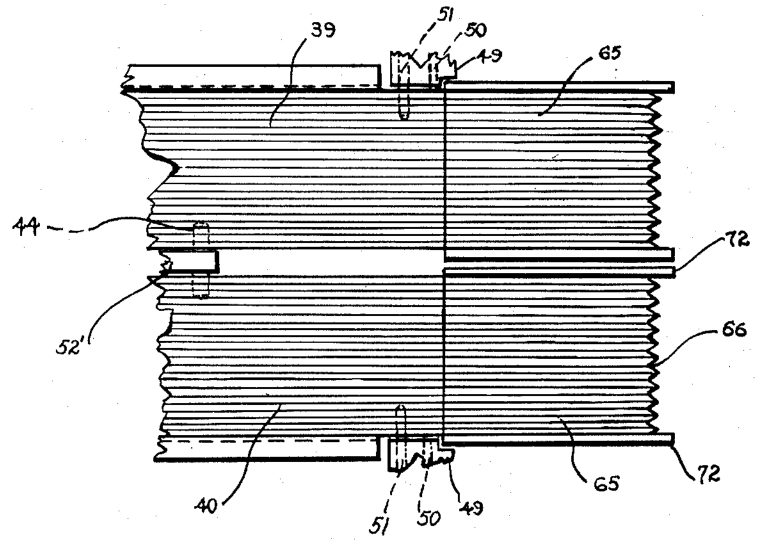
Fig. 17 is a partial plan view of a modification of the feed chain guide race.
Figures 18, 19:
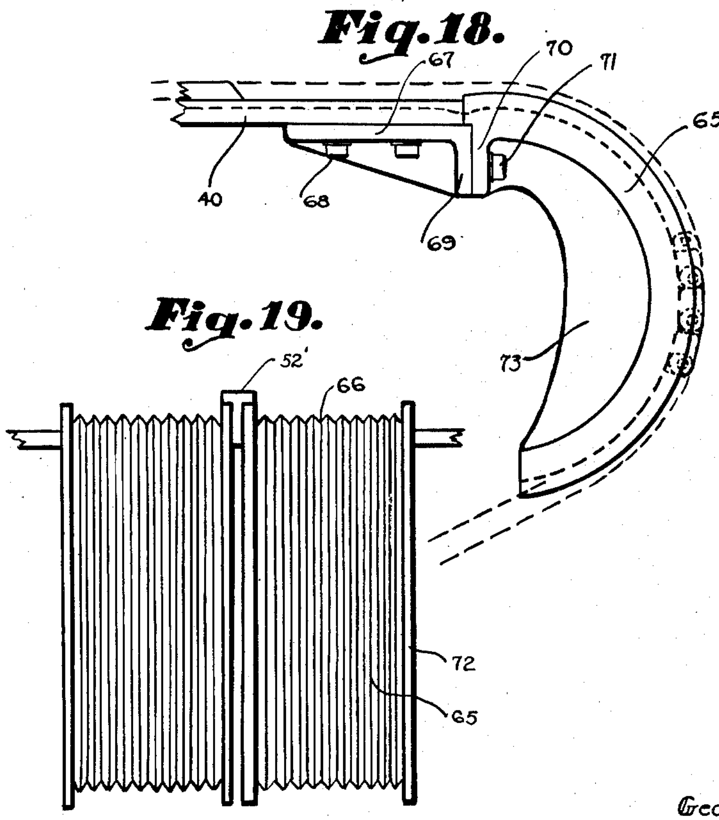
Fig. 18 is a partial side elevation thereof.
Fig. 19 is a partial front elevation thereof.
Figures 20, 21:
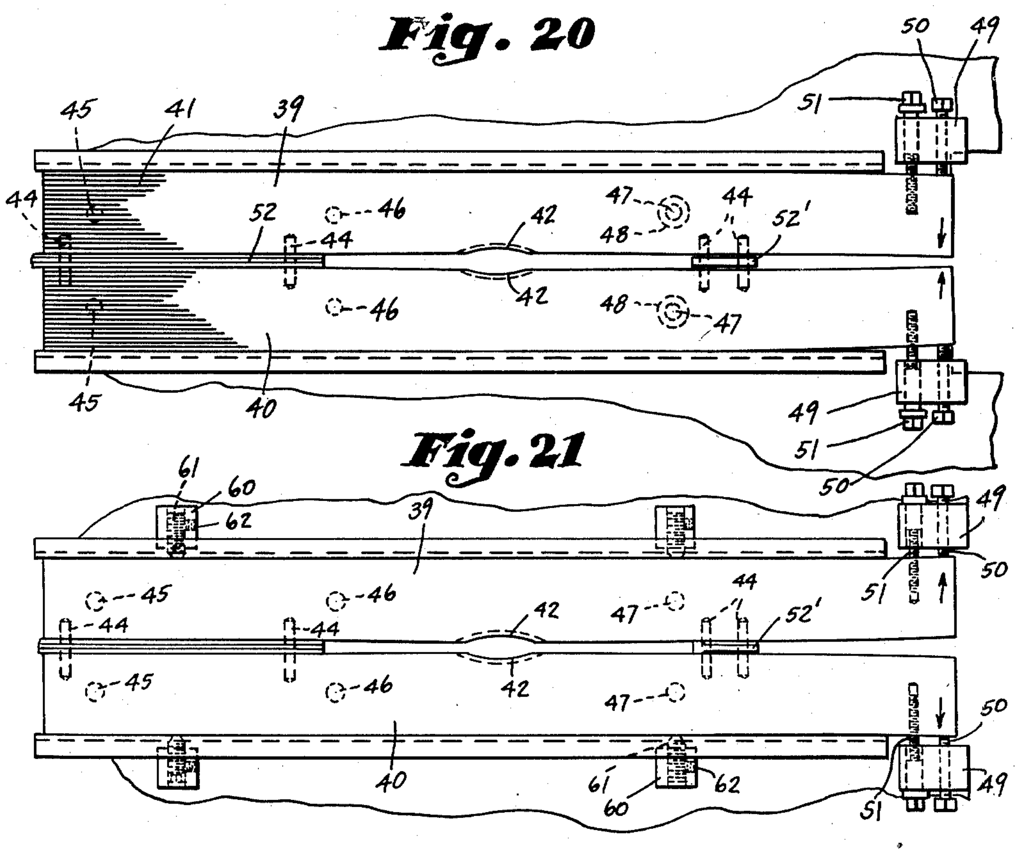
Fig. 20 is the same as Fig. 8 with the guide races shown in concave bowed relation somewhat exaggerated.
Fig. 21 is the same as Fig. 14 showing the guide races in convex bowed relation somewhat exaggerated.

In the structure heretofore described the feed chains pass over a pair of pulleys 63 and 64. The pulley 63 is a drive pulley and the pulley 64 is an idler pulley. I have found that under certain conditions it is most advantageous to have the feed chains move over continuations of the guide races 39 and 40 which continuations are arcuate and take the place of the idler pulleys 64. To this end I provide arcuate extensions of each of the guide races 39 and 40. In view of the fact that each of these extensions is identical a description of one will be sufficient. The extension of the guide race 40 comprises, as illustrated in Figs. 17, 18 and 19, an arcuate race 65 extending forwardly and curved downwardly at the intake end of the machine. The curvature of this extension and the diameter of the circle on which the race is curved is substantially the same as that of the idler pulley 64. The top surface of this race 65 is provided with V shaped grooves 66 which coincide with the V shape grooves 41 in the race 40. The arcuate race plate at its top end abuts against race 40 and forms practically a continuation thereof. It is rigidly secured to the race 40 through the medium of a bracket 67 secured by bolts 68 to the underface of the race and this bracket extends slightly beyond the edge of the race 40. It is provided with a down-turned end 69 to which the curved race 65 is secured through the medium of a down-turned meeting flange 70 and bolts 71. The curved race extension 65 is provided on each side with upwardly extending sides 72 which assist in confining the feed chain to its path of travel and the underface of the race 65 is provided with a reinforcing web 73.

Figure 5:
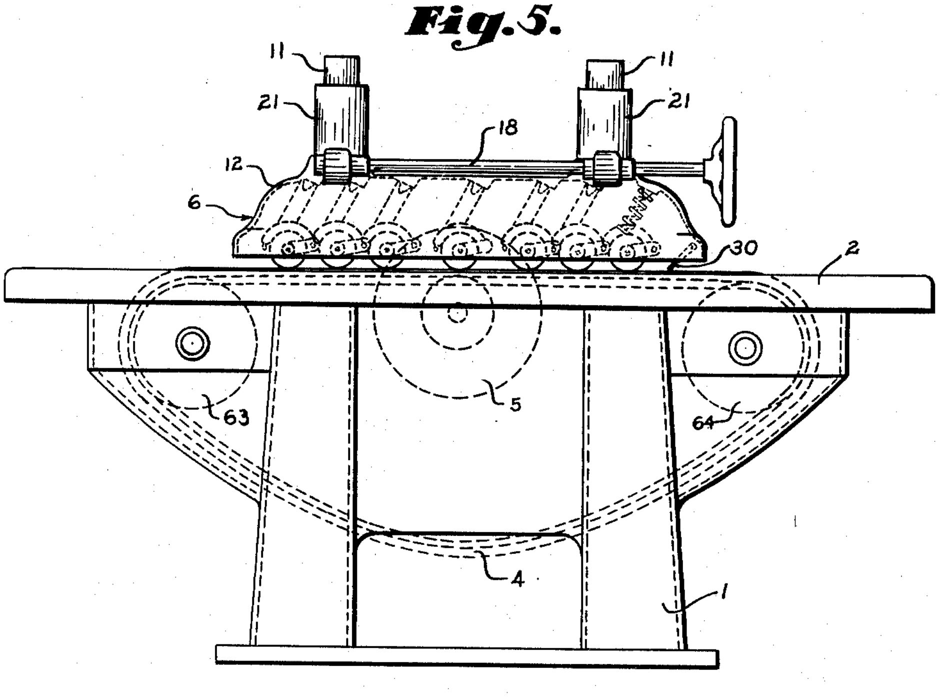
Fig. 5 is an side elevation of the presser head.
Figure 6:
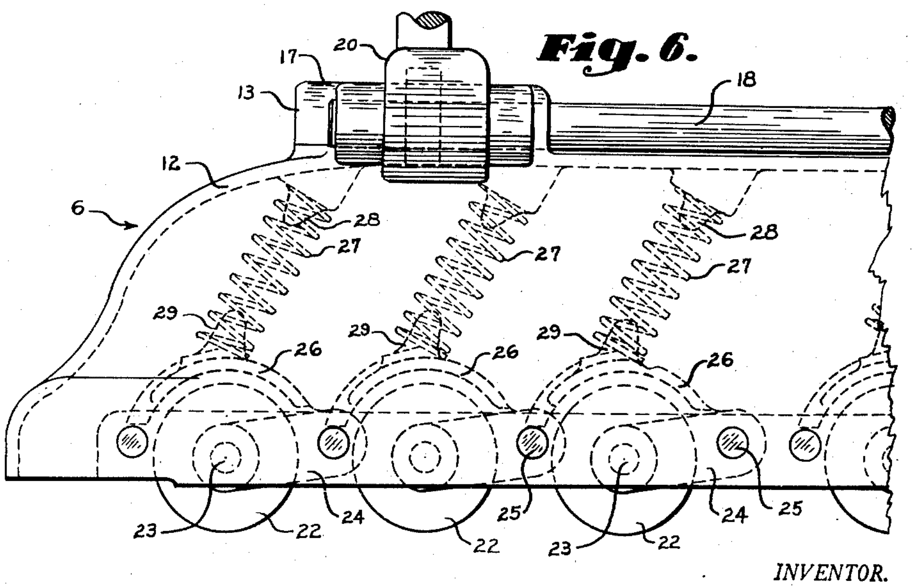
Fig. 6 is a detailed elevation of the presser head showing the mounting of presser rolls.

The feed chain instead of, as in the structure illustrated in Fig. 5, passing over the idler pulley 64 passes over the extension 65 with the ribs on the underface of the feed chain interengaging with the ribs and recesses on the upper face of the guide race extension 65.

As a result of this arrangement the chains slide around the semi-circular race ways and are thus self cleansing. Furthermore the semi-circular race ways move with the front end of the top flat race ways and as a result the chain races of the semi-circular race ways are always in alignment with the top flat race ways irrespective of any sprung adjustment thereof thereby maintaining the feed chains in perfect alignment throughout their travel.

While the invention as shown herein is applied to a rip saw machine it may similarly be applied and used to advantage in wood working machines utilizing other cutting tools, as well as a glue or a veneer jointer; and whereas the guide races are illustrated in the form of spaced members to provide the central longitudinal slot therebetween through the medium of a spacing fin 52, they may be formed integrally joined in place of the spacing fin with the longitudinal slot cut therein. Furthermore, whereas the guide races are shown as having their free spaced ends at the in-feed end of the machine, this arrangement may be reversed so that the free ends of the races are at the out-feed end of the machine with the solid end at the in-feed end.

The chain race arrangement shown generally in Fig. 8 but without the short spacing block 52 and reversely arranged so as to be anchored at the in-feed end for free end adjustment at the out-feed end, would enable stock to be ripped and at the same time be given a hollow (concave) joint. To accomplish this, the stock is ripped as usual by the front of the saw blade after which it is carried in a slight arc past the heel of the saw blade, at which time a hollow joint is produced. Such an arrangement would save up to 40% on labor and approximately 20% on material.

I claim as my invention:

1. In a feeding mechanism for a wood working machine, in combination, a base, a table supported on top of said base, a cutting tool projectable above the top of said table, a presser head disposed above said table having resilient means for pressingly engaging the work as it is fed across said table to said tool, a feed chain travelling across said table, a guide race supported on said table having a pair of spaced apart race members, said feed chain and guide race having interengageable longitudinally disposed ribs preventing the lateral displacement of feed chains relative to said race, means for anchoring the rear end of said guide race against displacement from a point adjacent the rear edge of the saw and extending to the rear of the race, a stationarily mounted anchoring pivot engaging each race member at a point adjacent the front edge of said tool and means for laterally displacing the free ends of the race members.

2. In a feeding mechanism for a wood working machine, in combination, a base, a table supported on top of said base, a cutting tool projectable above the top of said table, a presser head disposed above said table having resilient means for pressingly engaging the work as it is fed across said table to said tool, a feed chain travelling across said base, a guide race for said feed chain supported on said base having a pair of spaced apart substantially flat extension bars each having guide ribs on its face, means for anchoring said race to the supporting frame at at least one point beyond the rear edge of the saw, means for anchoring each bar against lateral displacement at one point adjacent the front edge of the tool, and means for displacing laterally the free end of each bar.

3. In a feeding mechanism for a wood working machine, in combination, a base, a table supported on top of said base, a wood working tool, a presser head disposed above said table having resilient means for pressingly engaging work as it is fed across the table to the saw, a feed chain travelling across said table, a guide race having a central slot therein for accommodating said tool, the input ends of said guide race on either side of said slot being extended into arcuate downwardly extending projections, said guide race and said chains having longitudinally disposed interengaging ribs to prevent relative displacement between said chains and race, and adjustable means engageable with said guide race on each side of said slot to flex it in a horizontal plane.

4. In a feeding mechanism for a wood working machine, in combination, a base, a table supported on said base, a guide race supported on said table, a work carrying feed chain travelling across said table, said feed chain and guide race being interengageable to prevent lateral displacement therebetween, means for anchoring said guide race at one point in its length to said table against lateral displacement, and race adjusting members engageable with said guide race at a point spaced from said anchoring means adjustable to spring a portion thereof into a curved path to effect a curvature in the travel of the chain.

5. In a feeding mechanism for wood working machines, in combination, a base, a table supported on said base, a cutting tool on said machine, a guide race supported on said table having a pair of longitudinally spaced portions mounted in the same plane adjacent said tool, a feed chain mounted to travel over said guide race, said feed chain and guide race having means to prevent lateral displacement therebetween, means for anchoring one end of said guide race to said table against lateral displacement thereof from a point adjacent one side of the tool, and race adjusting members carried by said base engageable with opposite sides of said spaced race portions at the free ends thereof adjustable to spring said portions toward or away from each other to curve the path of travel of the chains relative to said tool.

6. In a feeding mechanism for a wood working machine, in combination, a support, a wood working tool operable on said support, a guide race mounted on said support extending past said tool, a feed chain mounted to travel over said guide race having interlocking relation therewith against lateral displacement, means for anchoring said race to said support at one point within its length, and race adjusting members carried by said base engaging with said race at a point spaced from its anchor point adjustable to spring said race between said points to effect curvature thereof and provide a curved path of travel of said feed chain and the work carried thereby relative to said tool.

7. In a feeding mechanism for wood working machines, in combination, a supporting base, a wood working tool mounted on said base, a guide race carried by said base and adjacent said tool having a pair of substantially parallel spaced portions mounted in the same plane extending on each side of said tool respectively, a pair of feed chains each travelling over one of the spaced portions of said guide race, means for preventing the lateral displacement of said feed chains relative to said guide race spaced portions, means for anchoring one end of said guide race to said base against lateral displacement from a point adjacent one side of the tool, and race adjusting members carried by said base engageable with opposite sides of said spaced guide race portions at the free ends thereof adjustable to spring said portions toward or from each other to curve the path of travel of the chains relative to said tool.

GEORGE M. GUSTIN.

REFERENCES CITED

The following references are of record in the file of this patent:

UNITED STATES PATENTS

| Number | Name | Date |
|---|---|---|
| 303,425 | Feyh et al. | Aug. 12, 1884 |
| 315,337 | Phillip | Apr. 7, 1885 |
| 450,402 | Corliss | Apr. 14, 1891 |
| 1,109,747 | Giertsen | Sept. 8, 1914 |
| 1,241,871 | Meyers | Oct. 2, 1917 |
| 1,700,400 | Carlson et al. | Jan. 29, 1929 |
| 1,744,875 | Edwards | Jan. 28, 1930 |
| 1,796,369 | Hirst | Mar. 17, 1931 |
| 1,813,355 | Lucas | July 7, 1931 |
| 2,216,721 | Crouch | Oct. 8, 1940 |
| 2,242,813 | Cook | May 20, 1941 |
| 2,320,715 | Bowling | June 1, 1943 |
| 2,436,091 | Bolling | Feb. 17, 1948 |